United States Patent
Schwartz et al.

(10) Patent No.: US 7,009,488 B2
(45) Date of Patent: Mar. 7, 2006

(54) SELECTIVE EQUIPMENT LOCKOUT

(75) Inventors: David Schwartz, Moorpark, CA (US); Mike Daily, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 301 days.

(21) Appl. No.: 10/256,097

(22) Filed: Sep. 25, 2002

(65) Prior Publication Data

US 2004/0056758 A1   Mar. 25, 2004

(51) Int. Cl.
*H04Q 1/00*   (2006.01)

(52) U.S. Cl. .................. 340/5.2; 340/5.72; 340/426.24

(58) Field of Classification Search ............... 340/5.52, 340/5.53, 5.82, 5.83, 5.65, 5.72, 5.8, 5.64, 340/825.71, 286.01; 235/422; 307/149; 713/182; 455/100
See application file for complete search history.

(56) References Cited

U.S. PATENT DOCUMENTS

| | | | | |
|---|---|---|---|---|
| 4,048,986 A | * | 9/1977 | Ott ............................. | 340/5.82 |
| 4,591,854 A | * | 5/1986 | Robinson .................... | 340/5.65 |
| 5,666,106 A | * | 9/1997 | Nasman ....................... | 340/5.52 |
| 5,682,032 A | * | 10/1997 | Philipp ........................ | 235/422 |
| 5,796,827 A | * | 8/1998 | Coppersmith et al. ....... | 713/182 |
| 5,811,897 A | * | 9/1998 | Spaude et al. .............. | 307/149 |
| 5,914,701 A | * | 6/1999 | Gersheneld et al. ... | 340/825.71 |
| 6,441,721 B1 | * | 8/2002 | Tajima et al. .......... | 340/286.01 |
| 6,580,356 B1 | * | 6/2003 | Alt et al. ...................... | 340/5.8 |
| 6,754,472 B1 | * | 6/2004 | Williams et al. ............ | 455/100 |
| 6,771,161 B1 | * | 8/2004 | Doi et al. ................... | 340/5.64 |
| 2002/0125994 A1 | * | 9/2002 | Sandau et al. ............. | 340/5.72 |
| 2003/0096593 A1 | * | 5/2003 | Naboulsi .................... | 340/576 |

* cited by examiner

*Primary Examiner*—Brian Zimmerman
(74) *Attorney, Agent, or Firm*—Tope-McKay & Associates (57) ABSTRACT

A method and an apparatus are presented for selectively locking controls from operators operating equipment. The invention actively detects when an operator accesses a control for which lockout is desired. After detection, the invention locks the control to prevent the operator from operating the control. Thus, operators are permitted selective access to controls. The active detection of when an operator is accessing a control is performed by first generating a signal, which is passed to a plate, where it is then coupled through the operator to a receiver. The signal is detected at a signal detector attached with a control so the control can react to the signal. In an automotive situation, the plate may be in a vehicle seat, with the signal coupling through a driver or passenger upon actuation of a control. Based on the signal received, the function of the control may be eliminated, altered, or reduced.

21 Claims, 5 Drawing Sheets

SELECTIVE EQUIPMENT LOCKOUT

BACKGROUND

1. Technical Field

The present invention relates generally to equipment operation and more specifically to systems that selectively prevent access to equipment controls for reasons such as safety.

2. Discussion

According to reports by the U.S. National Highway Traffic Safety Administration, an estimated 20% of all reported automobile crashes each year involve some form of driver distraction. Thus, there has been significant interest recently regarding the issue of driver distraction, as well as concerns that many of the telematic features planned for automobiles may lower their safety through increased driver distraction. Various approaches for dealing with the problem of driver distraction have been developed. While these approaches may be effective for reducing the effects of driver distraction on driver safety, they do not prevent it. It would be desirable to provide a mechanism that selectively prevents the equipment operator (e.g., driver) from operating a selected set of controls.

The following references are provided for further background information:

[1] Zimmerman, T. G., "Personal Area Networks: Near field intrabody communication," *IBM Systems Journal*, Vol. 35, No. 3 & 4, 1996.

[2] Fukumoto, Masaaki, et. al, "Body Coupled FingeRing: Wireless Wearable Keyboard," CHI 97, pgs. 147–154, March 1997.

SUMMARY

The present invention provides a method and an apparatus for selectively locking controls from at least one operator operating equipment. In the method, a step of actively detecting when an operator is accessing a particular control for which an operator lockout is desired is performed. Then the control is locked to prevent the operator from operating the particular control; whereby an operator is permitted selective access to controls in order to promote operator safety. In a further aspect, the active detection of when an operator is accessing a particular control for which an operator lockout is desired begins with the generation of a signal. Next, the signal is passed to a plate. Next, the signal is capacitively coupled from the plate to the operator. The signal is further coupled from the operator (capacitively or resistively, depending on the specifications required for an application) to a receiving pad. Then the signal is detected by a signal detector attached with a control, whereby the control reacts in response to a signal received at the signal detector and into the control.

In another aspect, the signal is an electrostatically-coupled signal, which may be passed through the posterior portion of a person (e.g., buttocks, thighs, and back) of an operator through to the extremities (e.g., hands, wrists, and fingers) of the operator when the operator touches a control.

In still another aspect, different signals are provided for different operators, and in the locking of the control, the control is selectively locked based on the signal received.

In yet another aspect, the signals are passed through the posterior portion of the operators by use of signal transmitters incorporated with seats on which the operators sit during operation of the equipment, whereby different signals may be transmitted from different signal transmitters incorporated into different seats so that operators sitting on different seats may be selectively locked from controls based on the seat upon which they sit. Further, the identity of an operator may be detected, and the locking of the control may be performed by selectively locking the particular control based on the identity of the operator, whereby operators are given selective access to equipment controls.

In another aspect, the identity of an operator is performed by a means selected from the group consisting of a key-based identifier, a remote-based identifier, a combination-based identifier, a vision-based sensor, a weight sensor, a voice recognizer, and a bioelectric sensor.

In still another aspect, the invention may also perform a monitoring of the amount of activity in relation to the operator's primary activity. In this case, the locking of the controls is performed by further selectively locking the controls based on the amount of activity related to the operator's primary activity, whereby the operator's ability to use various controls may be varied based on the amount of activity the operator is dedicating to the primary activity.

In a further aspect, the locking of at least a portion of the controls may occur in response to an operator override, whereby an operator may override the locking of controls.

In a still further aspect, the system state may be monitored, where the system state comprises the state of at least one of the operator and the equipment and wherein in the locking of the controls, controls are further selectively locked based on the system state.

In another aspect, the operator is a driver of a vehicle, where the speed of the vehicle is monitored, and wherein in the locking of the controls, controls are further selectively locked based on the speed of the vehicle, whereby a driver's ability to use various controls may be varied based on the vehicle's speed.

Each of the operations of the method discussed above typically corresponds to logical operations or means for performing the function on a computer or a piece of dedicated hardware with instructions "hard-coded" therein in circuitry. In other aspects, the present invention provides an apparatus comprising a set of dedicated hardware blocks for generating a signal, for passing the signal to an operator, for receiving the signal from the operator, for detecting the signal from the operator, and for providing selective access control to equipment controls based on the signal received.

BRIEF DESCRIPTION OF THE DRAWINGS

The objects, features and advantages of the present invention will be apparent from the following detailed descriptions of various aspects of the invention in conjunction with reference to the following drawings.

DETAILED DESCRIPTION

The present invention relates generally to equipment safety, and more specifically to systems that selectively prevent access to controls. An example application of these systems is in the area of automotive safety. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various physical aspects of the present invention is provided. Finally, a discussion is provided to give an understanding of the specific details.

Glossary

Before describing the specific details of the present invention, it is useful to provide a centralized location in which various terms used herein and in the claims are defined. The glossary provided is intended to provide the reader with a general understanding for the intended meaning of the terms, but is not intended to convey the entire scope of each term. Rather, the glossary is intended to supplement the rest of the specification in more accurately explaining the terms used.

Equipment—This term refers to knobs and other controls used to operate various types of equipment. In a situation where the equipment is inside a vehicle, the equipment may include items such as radio controls (e.g. buttons and knobs), and heating/cooling controls as well as driving controls such as the emergency brake and steering wheel. Other examples of equipment in an automobile, to which the present invention can be applied, include electronic devices such as touch screens or electronic maps, where it is desirable to limit or eliminate functionality for a particular operator or operators. Many other situations may be envisioned such as operation of equipment inside a power plant, along an assembly line, etc. The equipment may be selectively locked out based on where an operator is located, on the overall state of the equipment, or on the overall state of a selected subset of the equipment.

Extremities—This term refers generally to the portion of the body used for operating a particular device, and typically refers to the various portions of an operator's hands and wrists. However, in some situations, other bodily portions such as portions of the head or feet may be used to operate controls, and thus may also be considered extremities.

Means—The term "means" as used with respect to this invention generally indicates a set of operations to be performed on a processor. Non-limiting examples of "means" include computer program code (source or object code) and "hard-coded" electronics. The "means" may be stored in the memory of a computer or on a computer readable medium.

Operator—This term refers generally to any equipment user, and more specifically to any equipment user that is to be locked out from selected pieces of equipment. For example, in a case involving a car, it may be desirable lock the driver out from certain pieces of equipment and to lock various passengers out from other pieces of equipment (or not to lock them out at all). In this case, the term "operator" is provided with reference to the operation of "equipment" as defined above, and not only the driver of the vehicle. Depending on the configuration of the system, "operator" may refer to one operator or to multiple operators.

Posterior portion—This term refers generally to the backside of an operator, including the back portion of the legs, the buttocks, the back, etc. However, in some embodiments, such as in a case where an operator is strapped into a seat, other body portions may be used for the same purpose, such as the shoulders or chest.

Discussion

The present invention provides a mechanism for selectively locking out certain equipment operators from certain (telematic, etc.) features for safety reasons, while permitting access by others. In one aspect, the present invention is used as a mechanism for selectively preventing drivers of vehicles from operating (manipulating the controls of) selected pieces of equipment within a vehicle in order to minimize the danger due to related driver distraction, while selectively permitting passengers to operate the equipment. An example of this situation is when an automobile is equipped with a touch screen, such as a map/navigation system, or an Internet-connected device, where it is safer for a passenger to operate the device than the driver (when the vehicle is moving). In this case, different operators may be provided with different levels of access to the device. For example, when the vehicle is in motion, the driver may only be able to turn selected features on and off, while the front seat passenger may be able to access a full set of menus and options as well as other features such as e-mail. The discussion herein is presented in the context of use with automobiles, but it is important to note that the present invention is applicable to a wide variety of situations in which it is desirable to lock out a particular operator from a particular set of equipment controls.

Figure 1:
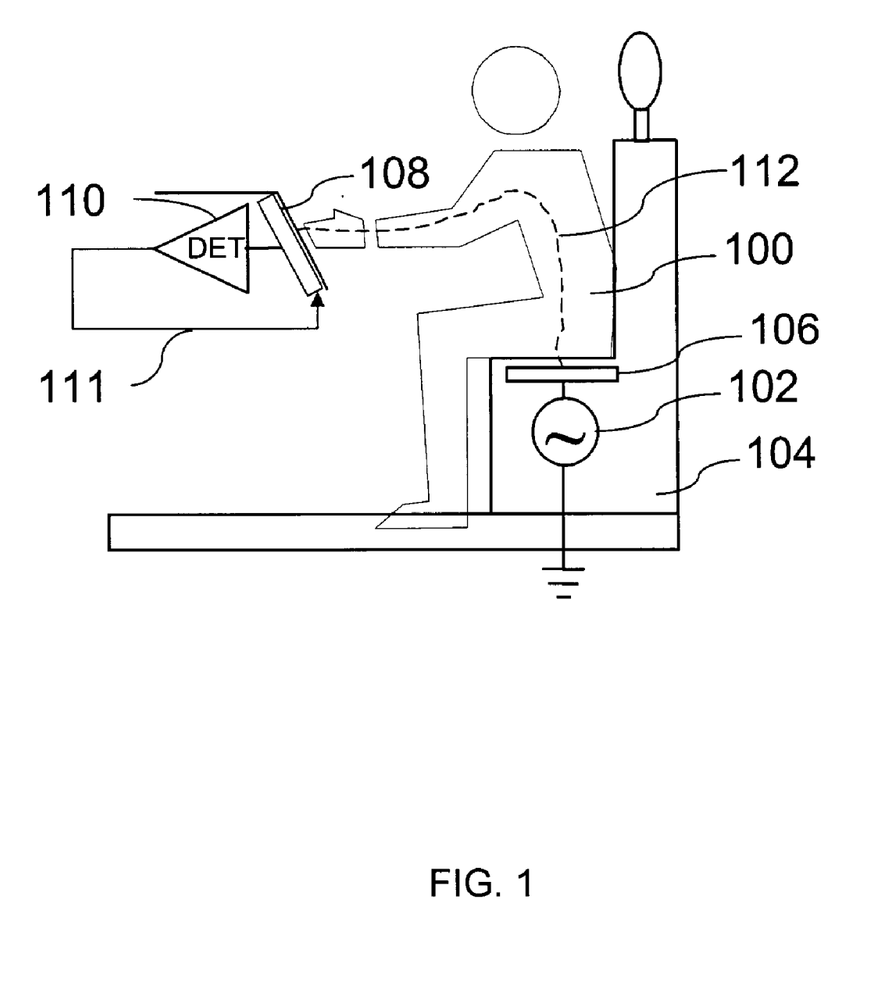
FIG. 1 is an illustrative diagram showing an aspect of the present invention as applied to a seated equipment operator, e.g. a driver or passenger of an automobile.

An illustrative diagram is presented in FIG. 1, showing an aspect of the present invention as applied to a seated equipment operator 100, such as the driver or a passenger in an automobile. A signal from a signal generator 102 is coupled from the seat 104, where the operator 100 is located, via a plate 106 through the operator 100. This coupling is capacitive in nature because the plate 106 is insulated from the user by clothing, the seat cushion, etc. The controls 108 are generally, but not necessarily, resistively conductive so that they act as receiving pads to receive the signal coupled through the operator 100. Thus, when the operator 100 touches a control 108, a coupling occurs and the signal is passed to a signal detector 110 connected with the control 108. Once the operator 100 touches the control 108, receipt of the signal by the signal detector 110 triggers a lockout signal 111, so that the control 108 is not responsive to the operator 100. The activation of the lockout function can be tailored so that it varies depending on circumstances, such as the identity of a particular operator, the role of the operator 100 (e.g., whether the operator is a driver or a passenger—and if the operator 100 is a passenger, where are they located), the current state of the equipment operated (e.g. in the case of a vehicle, whether the vehicle is in motion), the level of overall operator activity, etc. On the other hand, it may be desirable to make the features that are locked-out to one operator 100 (such as the driver) accessible to other potential operators, such as passengers in a vehicle. Further, as previously mentioned, detecting when the operator 100 touches a control 108 is accomplished by electrostatically coupling a signal between a plate 106 and a control 108, with the electrical path 112 indicated by a dashed line in the figure. Thus, the signal generated by the signal generator 102 is passed through a plate, coupling through an operator to a receiving pad, and the signal is then detected by a signal detector 110. Note that a single signal detector 110 may be used to discriminate between different signals, or multiple signal detectors 110 may be used, with each detecting a single signal. Coupling with a person can be achieved, for example, with a conductive flexible plate under a seat cover so that conduction occurs via the buttocks of a person through to his or her fingers (or vice-versa) when the person touches a control, and is generally resistive in nature. The receiver pickup may be achieved, for example, with a transparent conductive coating for touch-activated displays, or with simple conductive plastics for more conventional knobs, buttons, etc. Although resistive coupling is most common, other techniques may be used for this purpose; for example capacitive coupling may be used in situations involving certain types of controls such as touch screens. Additionally, a variety of mechanisms may be used in order to determine operator 100 identity, a few examples of which include key-based identifiers (in which a user's identity is embedded in a key-device such as a standard automobile key or a swipe card), remote-based identifiers (such as a radio transmitter embedded in a keychain-based device), a combination-based identifier (such as a combination entered in order to gain access to equipment to be operated), a vision-based sensor (such as a video camera with appropriate segmentation/recognition capability), a weight sensor, a voice recognizer, bioelectric recognizer/sensor, or a bio-impedance sensor (distinguishing people among a small group, for example, by body composition).

Depending on the needs of a particular situation, it may also be desirable to provide multiple signals to indicate different operators. For example, in the case of a vehicle, it may be desirable to have different lockout settings for different operators of the controls. Thus, an operator who is driving may be locked out of a certain set of controls under certain conditions, and operators who are passengers may be locked out of a different set of controls under a different set of conditions. This "selective" lockout may be based on the particular seat in which the operator of the controls is located, or it may be based on other criteria. In the case of seat-based locking, different signals can be provided for operators accessing the controls from different places (e.g. a driver signal and a passenger signal assigned to driver and passenger seats, respectively) to allow for simple discrimination between the operators. This can be useful, for example, in situations where children are to be locked out from certain features that adults can use. A determination whether an operator is a child or an adult can be made either explicitly through user input to the system or through other sensors such as weight measuring devices. Similarly, different "profiles" may be used for different types of operators. A profile may be created that, when activated, controls access for a particular operator to which the profile is assigned. For example, a "valet" setting could be provided and activated by the driver when a car is given to a valet, possibly limiting the top speed of the vehicle, disallowing access to the car stereo, etc. In addition to these features, an override may also be provided so that an operator who needs access to a control, but who is locked out from the control may still gain the access they need.

Figure 2:
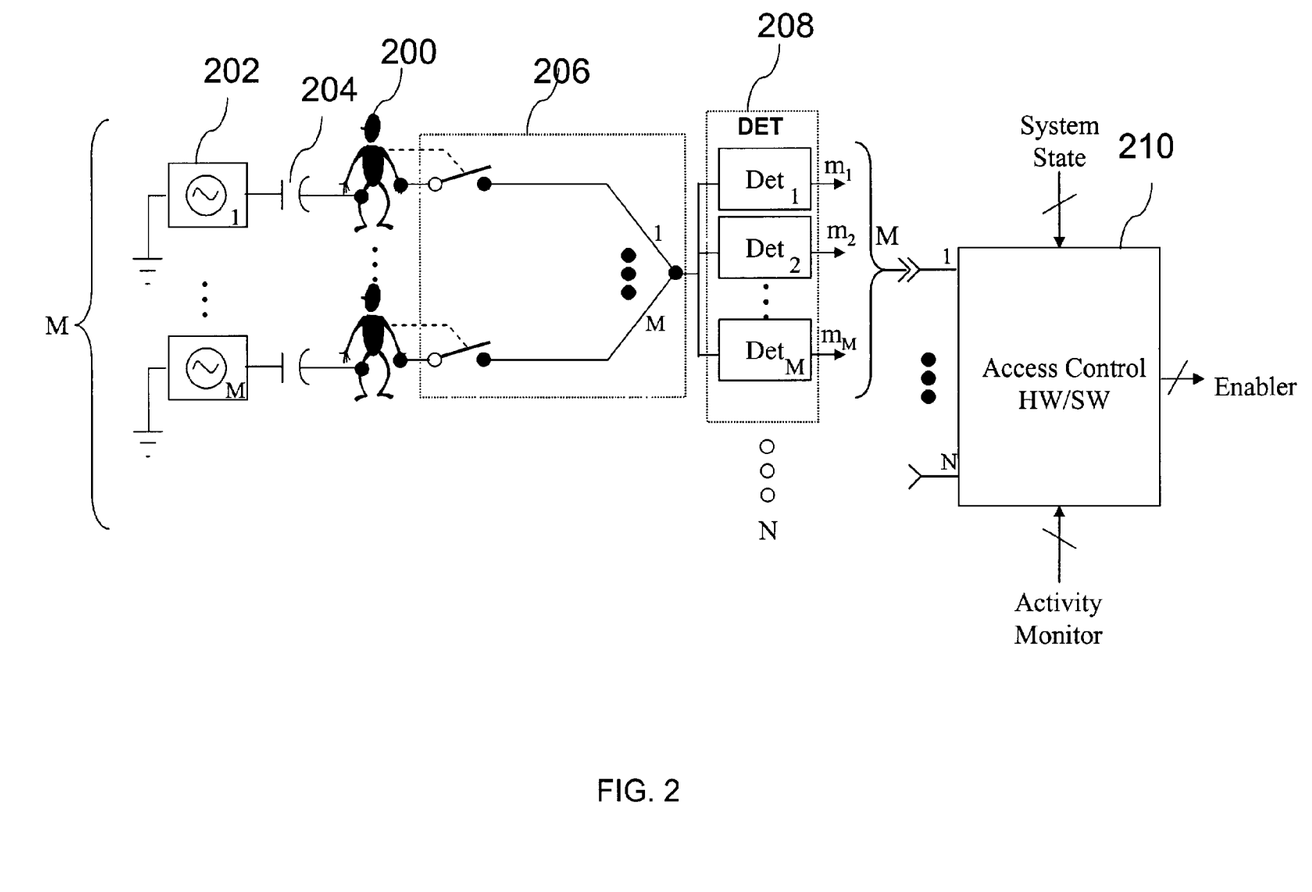
FIG. 2 is a system diagram depicting the relationship between various components of the present invention.

An example of a multi-operator version of the present invention is shown in FIG. 2, where the system is configured for use with a plurality of operators 200. A plurality of signal generators 202 are provided, and are each coupled to pass a signal through an operator 200 via a coupling device 204. Typically, the coupling device 204 is in the form of a plate as mentioned previously with reference to FIG. 1. A receiving block 206 is shown, typically in the form of a receiver such as a control constructed of a conductive material in combination with necessary connections, for receiving the signal through the user 200 and for providing the signal to a detector block 208. The receiving block 206 effectively acts as a switch, effected through the action of an operator touching a receiver pad. In this case, the detector block 208 includes a plurality of individual signal detectors for distinguishing among the various signals from different signal generators 202. A wide variety of configurations for the detector block 208 may be envisioned within the scope of the present invention, as will be appreciated by those skilled in the art. The detectors in the detector block 208 determine whether a signal of a particular type is received, and based on the signal or signals received, the detector block 208 provides a particular output to an access control block 210. The access control block 210, in turn, determines whether a particular control may be accessed by a particular operator 200. Because access to a particular control by a particular operator 200 may also depend on the system state (a combination of operator state and equipment state—e.g. in the case of a vehicle, whether the vehicle is moving or not), the access control block 210 also includes an input for receiving information regarding the system state. Although the activity level of an operator 200 is part of the operator's state, an input for an activity level monitor is also provided. The output of the control block 210 is an enable/disable signal that controls the access to each control for which access is to be governed. The access control 210 operates with rules that may be hardware or software-based. The signal generation/detection scheme may be duplicated for more controls and/or operators to provide a more complex system. Also, as with the detector block 208, a wide range of hardware configurations may be envisioned for the overall construction of devices that operate within the scope of the present invention. Also, with regard to the operator state component of the system state, it may also be useful to classify certain activities as "primary", such as steering, breaking, and accelerating (possibly in light of the vehicle's current speed) in the case of an equipment operator who is a driver, while classifying other activities as "secondary". Thus, the particular features locked out could be based on the amount of current activity related to the operator's primary activity, such as the amount of steering a driver is doing, allowing for a scalable lockout based on the driver's state.

Simple signal discrimination can be achieved by a wide variety of modulation differences, e.g. different carrier frequencies, different modulation of the carrier, different pulse widths, etc. A carrier frequency with different frequency tones, for example, is an effective, low-cost approach. The signaling scheme must detect the presence of the various signals allocated to different operators (e.g. the driver and passenger(s) in the case of a vehicle). In the preferred embodiment, the carrier frequency is choosen between 100 kHz and 500 kHz (though other frequencies may be suitable for other modulation and detection schemes).

Figure 3:
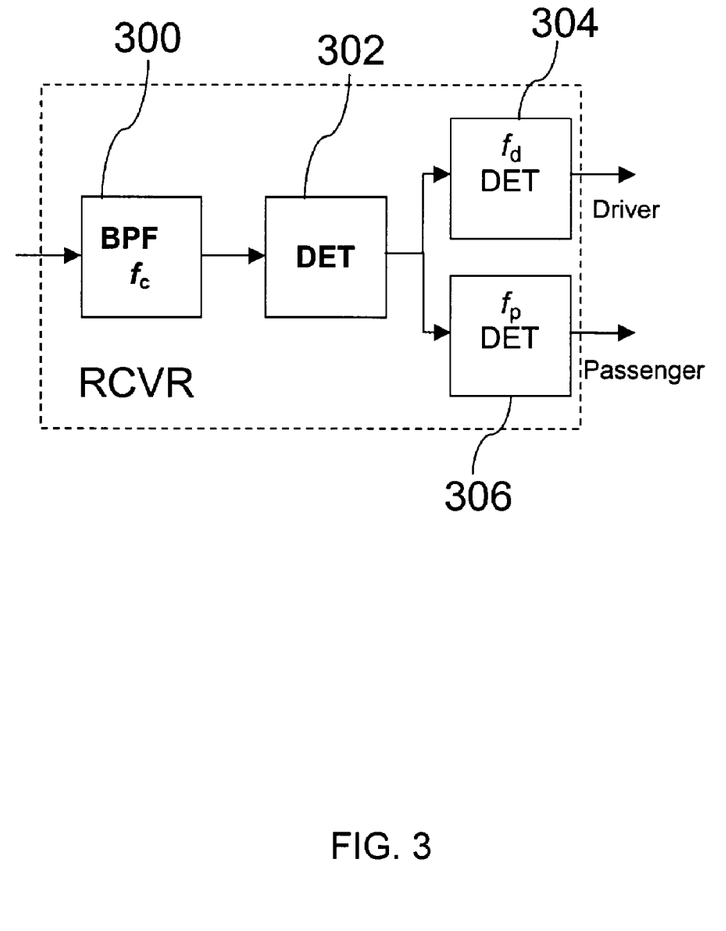
FIG. 3 is a block diagram of a simple receiver for use with the present invention.

A simple receiver for use with the present invention is depicted in the block diagram shown in FIG. 3. The receiver is presented with constraints useful in situations involving an automobile, with the operators including a driver and front seat passenger. The carrier frequency is $f_c$=300 kHz, the driver tone is a sine wave with $f_d$=500 Hz, and the passenger tone is a sine wave with $f_p$=2 kHz. If the driver signal is detected (above a threshold) due to an attempt to access a control and the vehicle is moving (a combination where the lockout depends both on an access attempt and the state of the equipment), and the driver is to be locked out of the particular piece of equipment, then the equipment does not function for the driver. Similarly, if the passenger signal is detected due to an attempt to access a control (where the lockout depends only on an access attempt), and the passenger is to be locked out of the particular piece of equipment, then the equipment does not function for the passenger. In the figure, a band-pass filter 300 is provided to filter for the carrier frequency $f_c$. A first detector 302 is connected with the band pass filter 300 to receive the carrier frequency $f_c$ component therefrom and to determine whether a signal exists on the carrier frequency $f_c$. If a signal has been detected on the carrier frequency $f_c$, the signal is passed to a first occupant-type detector 304 for detecting the driver frequency $f_d$ and to a second occupant-type detector 306 for detecting the passenger frequency $f_p$. The signal received is used to determine whether a lockout should be triggered.

Figure 4:
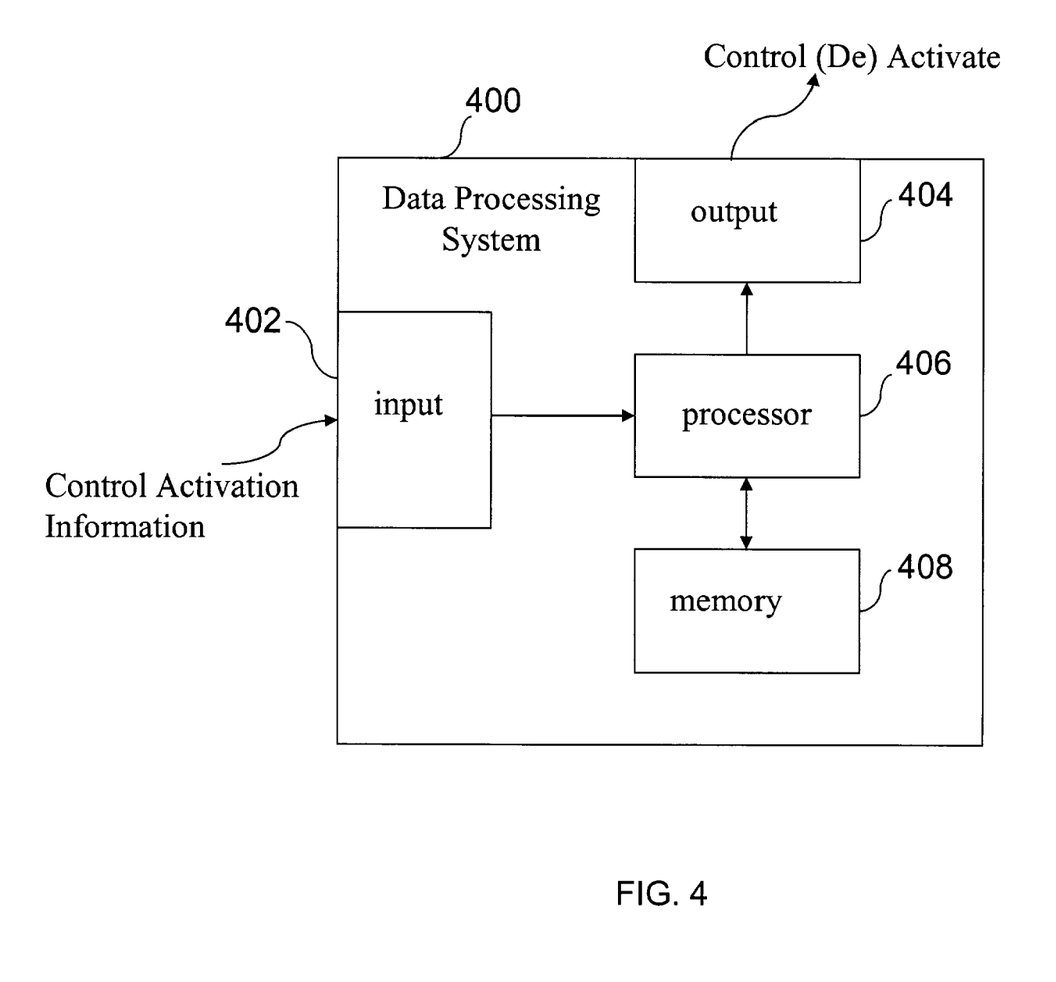
FIG. 4 is a block diagram of a simple access controller for use with the present invention.

A possible configuration for the access control 210 (discussed previously with respect to FIG. 2) is presented in FIG. 4. In this configuration, input is received into a data processing system 400 by a processor 406 from an input 402 via conductive materials on the controls (e.g., buttons and knobs—or conductive coatings in the case of a touch screen) on and around machinery controlled by an operator. The output 404 is connected with the processor. Output may be selectively provided back to the equipment operated by the controls in order to lock out a particular operator through which the signal to the input 402 was received. Output may also be provided to other devices for use therein. The input 402 and the output 404 are both coupled with a processor 406, which may be a general-purpose computer processor, but is typically a specialized processor designed specifically for use with the present invention. The processor 406 operates to decide, based on the input signal, whether to selectively lock the equipment to prevent use by the operator through which the signal was received. The processor 406 is coupled with a memory 408 to permit storage of data and software to be manipulated by the processor, such as user profiles and settings.

Figure 5:
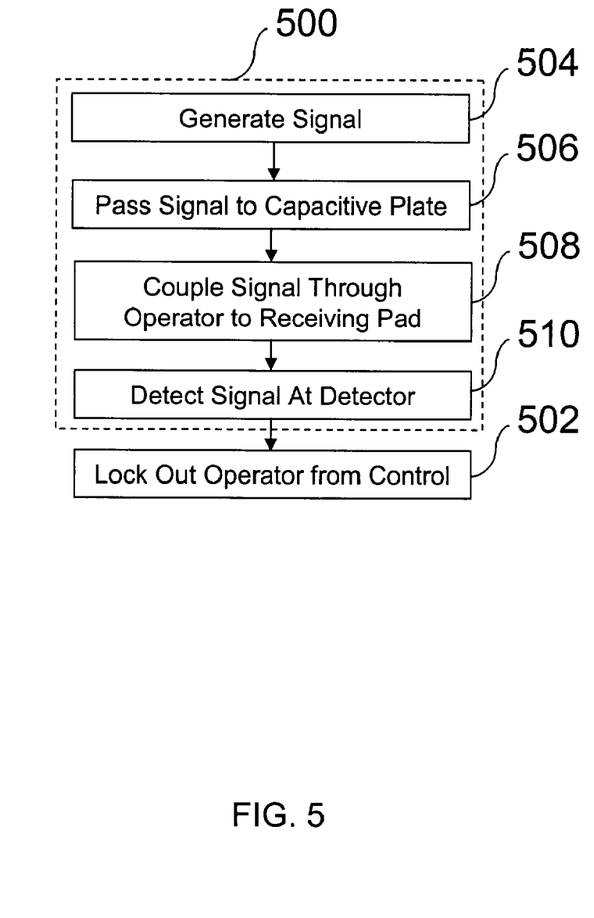
FIG. 5 is a flow diagram depicting the steps in a method according to the present invention.

Next, a flow diagram is presented in FIG. 5, showing the steps of a method according to the present invention. The method comprises a first general step of actively detecting when an operator is accessing a particular control for which an operator lockout is desired 500. Next, the control is locked to prevent the operator from operating the particular control 502. The combination of these steps ensures that an operator is permitted selective access to controls in order to promote operator safety. In a further aspect, the step of actively detecting 500 comprises additional sub-steps including generating a signal 504, passing the signal to a plate 506, coupling the signal from the plate through the operator to a receiving pad 508, and detecting the signal at a signal detector attached with a control 510. Thus, the response of a control is changed (or locked out) in response to a signal received at the signal detector via the control.

What is claimed is:

1. A method for selectively locking controls from at least one operator operating equipment comprising acts of:

actively detecting when an operator is accessing a particular control for which an operator lockout is desired; and locking the control to prevent the operator from operating the particular control; whereby an operator is permitted selective access to controls in order to promote operator safety, and wherein the act of actively detecting when an operator is accessing a particular control for which an operator lockout is desired is performed by acts of:

generating a signal;

passing the signal to a plate;

coupling the signal from the plate through the operator to a receiving pad; and detecting the signal at a signal detector attached with a control, and wherein the signal is an electrostatically-coupled signal, and wherein different signals are provided for different operators, and where the act of locking the control selectively locks the control based on the signal received, and wherein the signals are passed through a posterior portion of the operators by use of at least one signal transmitter incorporated with each of the seats on which the operators sit during operation of the equipment, whereby different signals may be transmitted from different signal transmitters incorporated into different seats so that operators sitting on different seats may be selectively locked from controls based on the seat upon which they sit.

2. A method for selectively locking controls from at least one operator operating equipment as set forth in claim 1, further comprising an act of detecting the identity of an operator and wherein the act of locking the control is an act of selectively locking the particular control based on the identity of the operator, whereby operators are given selective access to equipment controls.

3. A method for selectively locking controls from at least one operator operating equipment as set forth in claim 1, wherein the method comprises a further act of monitoring a system state comprising the state of at least one of the operator and the equipment and wherein, in the act of locking the control, controls are further selectively locked based on the system state.

4. A method for selectively locking controls from at least one operator operating equipment as set forth in claim 1, wherein the operator is the driver of a vehicle, and where the method comprises a further act of monitoring a speed of the vehicle, and wherein, in the act of locking the control, controls are further selectively locked based on the speed of the vehicle, whereby a driver's ability to use various controls may be varied based on the vehicle's speed.

5. A method for selectively locking controls from at least one operator operating equipment as set forth in claim 1, further comprising an act of monitoring the amount of activity related to the operator's primary activity and wherein, in the act of locking the control, controls are further selectively locked based on the amount of activity related to the operator's primary activity, whereby the operator's ability to use various controls may be varied based on the amount of activity the operator is dedicating to the primary activity.

6. A method for selectively locking controls form at least one operator operating equipment as set forth in claim 1, further comprising an act of overriding the locking of at least a portion of the controls in response to an operator override, whereby an operator may override the locking of controls.

7. An apparatus for selectively locking controls from at least one operator operating equipment, the apparatus comprising:

means for actively detecting when an operator is accessing a particular control for which an operator lockout is desired; and means for locking the control to prevent the operator from operating the particular control; whereby an operator is permitted selective access to controls in order to promote operator safety, and wherein the means for actively detecting when an operator is accessing a particular control for which an operator lockout is desired further comprises:

means for generating a signal;

means for passing the signal to a plate;

means for coupling the signal from the plate through the operator to a receiving pad; and means for detecting the signal at a signal detector attached with a control, and wherein the signal is an electrostatically-coupled signal, and wherein different signals are provided for different operators, and where the means for locking the controls selectively locks control based on the signal received, and wherein the signals are passed through a posterior portion of the operators by use of signal transmitters incorporated with seats on which the operators sit during operation of the equipment, whereby different signals may be transmitted from different signal transmitters incorporated into different seats so that operators sitting on different seats may be selectively locked from controls based on the seat upon which they sit.

8. An apparatus for selectively locking controls from at least one operator operating equipment as set forth in claim 7, further comprising a means for detecting the identity of an operator and wherein the means for locking the control is a means for selectively locking the particular control based on the identity of the operator, whereby operators are given selective access to equipment controls.

9. An apparatus for selectively locking controls from at least one operator operating equipment as set forth in claim 7, wherein the apparatus comprises a further means for monitoring a system state comprising the state of at least one of the operator and the equipment and wherein the means for locking the control selectively locks controls based on the system state.

10. An apparatus for selectively locking controls from at least one operator operating equipment as set forth in claim 7, wherein the operator is the driver of a vehicle, and where the apparatus comprises a further means for monitoring a speed of the vehicle, and wherein the means for locking the control selectively locks controls based on the speed of the vehicle, whereby a driver's ability to use various controls may be varied based on the vehicle's speed.

11. An apparatus for selectively locking controls from at least one operator operating equipment as set forth in claim 7, further comprising a means for monitoring the amount of activity related to the operator's primary activity and wherein the means for locking the controls locks controls selectively based on the amount of activity related to the operator's primary activity, whereby the operator's ability to use various controls may be varied based on the amount of activity the operator is dedicating to the primary activity.

12. An apparatus for selectively locking controls from at least one operator operating equipment as set forth in claim 7, further comprising a means for overriding the locking of at least a portion of the controls in response to an operator override, whereby an operator may override the locking of controls.

13. An apparatus for selectively locking controls from at least one operator operating equipment, the apparatus comprising:

at least one signal generator/detector for actively detecting when an operator is accessing a particular control for which an operator lockout is desired; and an access controller connected with the signal generator/detector for receiving a signal therethrough and for locking the control in response to the signal in order to prevent the operator from operating the particular control;

whereby an operator is permitted selective access to controls in order to promote operator safety, and wherein the signal generators/detectors further comprise:

a signal generator for generating a signal;

a plate connected to receive the signal from the signal generator;

a receiver on an equipment control for coupling the signal from the plate through the operator when the operator touches the control; and a detector attached with the receiver for detecting whether a signal is received and for passing a further signal to the access controller, and wherein the signal is an electrostatically-coupled signal, and wherein different signals are provided for different operators, and where the access controller selectively locks the control based on the signal received, and wherein the signals are passed through a posterior portion of the operators by use of signal generators and plates incorporated with seats on which the operators sit during operation of the equipment, whereby different signals may be transmitted form different signal generators incorporated into different seats so that operators sitting on different seats may be selectively locked from controls based on the seat upon which they sit.

14. An apparatus for selectively locking controls from at least one operator operating equipment as set forth in claim 13, further comprising an identity detector for detecting the identity of an operator and wherein the access controller selectively locks the particular control based on the identity of the operator, whereby operators are given selective access to equipment controls.

15. An apparatus for selectively locking controls from at least one operator operating equipment as set forth in claim 13, wherein the access controller further comprises an input for receiving information for monitoring a system state comprising the state of at least one of the operator and the equipment and wherein controls are further selectively locked based on the system state.

16. An apparatus for selectively locking controls from at least one operator operating equipment as set forth in claim 13, wherein the operator is the driver of a vehicle, and where the apparatus comprises a further monitor for monitoring a speed of the vehicle, and wherein the access controller further selectively locks controls on the speed of the vehicle, whereby a driver's ability to use various controls may be varied based on the vehicle's speed.

17. An apparatus for selectively locking controls from at least one operator operating equipment as set forth in claim 13, further comprising an override for sending a override signal to the access controller for overriding the locking of at least a portion of the controls in response to an operator override command, whereby an operator may override the locking of controls.

18. A method for selectively locking controls comprising acts of:

actively detecting when an operator is accessing a particular control for which an operator lockout is desired;

locking the control to prevent the operator from operating the particular control; whereby an operator is permitted selective access to controls in order to promote operator safety; and wherein different signals are provided for different operators, and where the act of locking the control selectively locks the control based on which of the different signals is received, and wherein the different signals may be transmitted from different signal transmitters incorporated into different seats so that operators sitting on different seats may be selectively locked from controls based on the seat upon which they sit.

19. A method for locking controls comprising act of:

actively detecting when an operator is accessing a particular control for which an operator lockout is desired;

detecting the identity of the operator; and selectively locking the particular control based on the identity of the generator, whereby operators area given selective access to equipment controls, and wherein different signals are provided for different operators, and where the act of selectively locking locks the controls based on which of the different signals is received, and wherein the different signals may be transmitted from different signal transmitters incorporated into different seats so that operators sitting on different seats may be selectivley locked from controls based on the seat upon which they sit.

20. An apparatus for locking controls comprising:

a plurality of signal generator/detectors for actively detecting when an operator is accessing a particular control for which an operator lockout is desired, wherein different signals are provided for different operators; and an access controller connected with the signal generator/detectors for receiving a signal therethrough and for selectively locking the control based on the signal received, and wherein the each of the plurality of signal generator/detectors may be incorporated into different seats so that operators sitting on different seats may be selectively locked from controls based on the seat upon which they sit.

21. An apparatus for selectively locking controls from at least one operator comprising:

a signal generator/detector for actively detecting when an operator is accessing a particular control for which an operator lockout is desired;

an identity detector connected with the signal generator/detector for detecting the identity of the operator; and an access controller connected with the identity detector, wherein the access controller selectively locks the particular control based on the identity of the operator, whereby operators are given selective access to equipment controls, and wherein different signals are provided for different operators, and where the access controller selectively locks the control based on the signal received, and whereby different signals may be transmitted from different signal generators incorporated into different seats so that operators sitting on different seats may be selectively locked from controls based on the seat upon which they sit.

* * * * *